Nov. 24, 1936.                    J. A. CAMPBELL                    2,061,830
                        LIQUID AND GAS CONTACTING APPARATUS
                              Filed Aug. 5, 1935
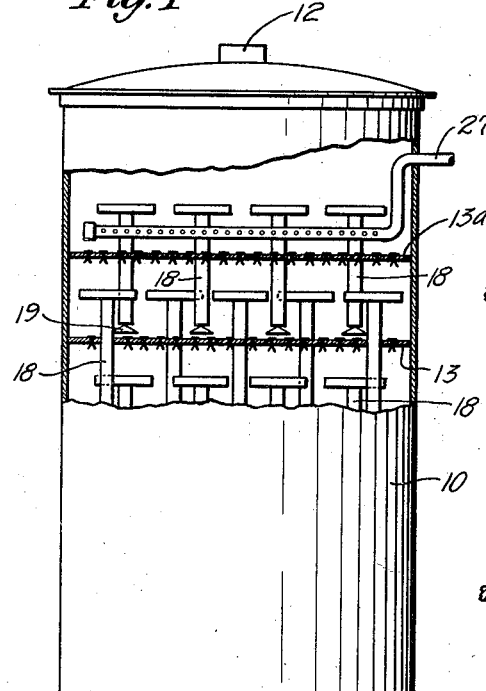
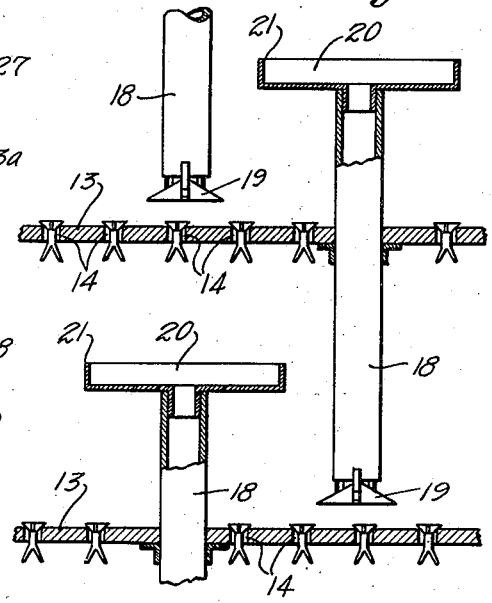
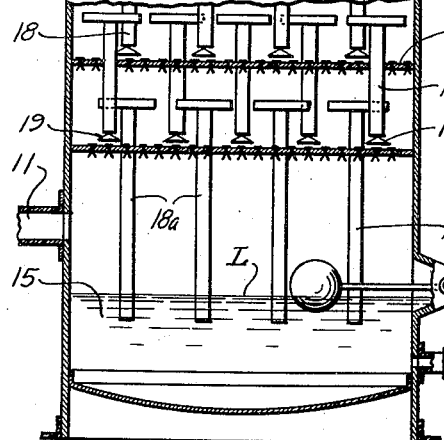
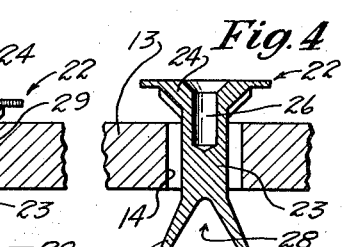
Inventor
Julian A. Campbell.
Attorney.

Patented Nov. 24, 1936

2,061,830

UNITED STATES PATENT OFFICE 2,061,830

LIQUID AND GAS CONTACTING APPARATUS

Julian A. Campbell, Long Beach, Calif.

Application August 5, 1935, Serial No. 34,767

7 Claims. (Cl. 261—113)

The invention deals broadly with liquid and gas contacting apparatus of the perforated plate type, in which a rising stream of gas or vapors is jetted into bodies of liquid on a series of plates or trays, through closely spaced plate apertures. Included in this general class of apparatus are absorbers, stills, rectifiers, dephlegmators, stabilizers and the like. With this understanding, the invention will be hereinafter described typically as applied to absorbers for recovering condensible constituents of natural gas. The present application is a continuation-in-part of my application, Ser. No. 754,800, filed Nov. 26, 1934 on Liquid and gas contacting apparatus.

It is a general object of the invention to provide in conjunction with the plate apertures, individual gas distributors acting to disperse the gas stream leaving the orifice, laterally above the surface of the plate and in a laterally upward direction through the oil body.

In the preferred form of the invention, the individual distributors associated with the plate apertures, consist of elements movable vertically in the plate apertures but retained against removal therefrom. Heretofore it has been proposed to provide in each of the plate apertures, a check valve which seats against the top surface of the plate to prevent liquid drainage through the aperture when the gas pressure beneath the plate drops to such an extent that the gas velocity through the apertures will not prevent liquid drainage. In normal operation, the valves are raised by the gas velocity, and the gas, as in the present apparatus, rises through the apertures and is deflected by the head of the valve laterally into the oil body standing on the plate. Experiments and tests in practical operation have demonstrated that check valves which seat to close the plate apertures as above explained, give rise to certain difficulties that at least in many cases renders them undesirable, if not entirely impractical. The reason is that, for example, when the absorber is started into operation with the valves initially seated and closing the plate apertures, the relatively high surface tension of the oil tends to hold the valves closed, and to prevent all the valves from opening simultaneously and to exactly the same extent, with the result that it is impossible to maintain a condition of uniform gas flow and distribution across the entire plate area. The inability of the valves to open simultaneously and to exactly the same extent seems to be due to the fact that notwithstanding that the surface tension of the oil opposing opening of the valves is substantially the same for each valve, it is impractical, if not impossible, to make the valves of exactly the same size and weight, and hence maintain exactly the same resistance to opening for each valve.

In accordance with the invention, these objectionable characteristics of check valves heretofore used in the present type of apparatus, have been entirely overcome by at all times maintaining a substantially annular clearance between each distributor and the edge of its respective aperture, or in other words by preventing the distributor from fully seating. The result is that even in their lowermost positions, the distributors will permit upward passage of gas through the plate apertures, whereby as when the absorber is started into operation, the oil surface tension that would otherwise tend to keep the distributors closed, is overcome by the gas streams themselves. Since it is possible to maintain a closely uniform clearance between each distributor and the edge of its respective plate aperture, there is established a condition of uniform gas flow through the apertures and uniform distribution of gas throughout the area of the plate.

The above mentioned, as well as various additional features and objects of the invention will be understood to best advantage from the following detailed description of an absorber embodying the invention in one of its typical forms. Reference is had throughout the description to the accompanying drawing, in which:

Fig. 1 is a view, partly in section, showing a typical form of absorber;

Fig. 2 is a fragmentary enlarged view showing the arrangement of down pipes and froth breaking pans on the plates;

Fig. 3 is a fragmentary enlargement showing one of the plate aperture distributors in seated position;

Fig. 4 shows the distributor in section and in raised position; and

Fig. 5 is a plan view of the distributor.

In Fig. 1, I have shown an absorber comprising a vertically extending shell 10 having a gas inlet 11 and an outlet 12 at the top. The shell contains a series of perforated plates 13 having closely spaced apertures 14 through which the gas passes upwardly to the outlet 12. Whereas in actual practice the absorber will include some form of plate supports and usually packing between the plates and the shell, these need not be illustrated since they comprise no part of the invention. The lean absorption oil fed onto the uppermost plate 13a through an inlet pipe 21, flows down over the successive plates in intimate contact with the rising stream of gas, and finally accumulates in a body 15 within the base of the absorber. The fat absorption oil is discharged through outlet line 16 under control of float operated valve mechanism 17, by means of which the oil body 15 is maintained at substantially constant level L.

The gas is jetted up through the small plate apertures 14 into the oil on the plates at such high velocity as to agitate the oil into bodies of froth which build up directly from the top surfaces of the plates. From each plate the oil is delivered to the plate next below through down pipes 18. The frothing action is promoted by spreader cones 19, mounted on the lower ends of the down pipes, which divert the oil radially in thin films or layers over the surfaces of the plates. The gas jetted up through the apertures traverses the oil thus being spread over the surface of the plate, at such high velocity as to transform the oil substantially completely into a mass of froth. The froth builds up to the top of pans 20 carried on the upper ends of down pipes 18, and is continuously broken by sharp pan edges 21 which rupture the froth bubbles and release the oil into the pans. The oil then drains down through the plate onto the one next below, and the described froth building and breaking operation continues on down through the absorber. The lowermost down pipes 18a terminate below the level L of the oil bodies 15, in order to seal the pipes against the entry of gas being introduced through inlet 11.

Each of the plate apertures 14 contains an element, generally indicated at 22, to which I have previously referred generally as a gas distributor overlying the aperture. Each distributor 22 comprises a stem 23 of smaller diameter than the aperture 14, and a downwardly tapered head 24 which seats on the upper edge of the aperture. The details of the distributor are best illustrated in Figs. 3 and 4 wherein, for purposes of illustration, it is shown in considerably larger proportions than its actual normal size. The distributor preferably will be made of a suitable light metal, and may conveniently be formed as a die casting. small irregularities or burs 25, see Fig. 5, which may be formed on the head 24 when the distributors are made by die casting, and allowed to remain because of the added advantage these sharp points give in securing a fine state of division and distribution of the gas within the oil on the plate. A bore 26 is drilled into the stem of the distributor for the purpose of making it desirably light in weight, and as a means of adjusting the weight to a nicety. Any suitable means may be used for preventing the distributors from lifting out of the apertures. As a simple expedient, I slot the lower end of the stem at 28, and after the distributor is inserted in the aperture 14, expand the prongs 23a beyond the aperture diameter.

A plurality of radially extending ribs 24a are formed on the head 24, the typical form illustrated having four ribs although a different number may be provided. As shown in Fig. 3, when the distributor is in its lowermost position, ribs 24a seat on the upper edge of the aperture 14, leaving a substantially annular (except for the width of the ribs) narrow gas passing clearance between the tapered head 24 and the top surface of plate 13. Where the distributor is used in conjunction with a plate aperture of the usual diameter, say around ⅜", the thickness of ribs 24a will be less than 1/16", preferably nearer 1/32", so that the gas passing clearance spaces between the ribs will be sufficiently restricted to cause the gas to spread radially outward into the oil body in thin high velocity streams.

During normal operation of the absorber, the distributors 22 will remain substantially in the position of Fig. 2, with ribs 24a seating on the plate 13, although gas velocity through the aperture 14 may be sufficient to raise the distributors to a position such as I have illustrated in Fig. 4. The gas rising through clearance space 29 impinges against the annular tapered surface of the head 24 and is deflected radially from the aperture in a thin, high velocity stream flowing in close proximity to the surface of the plate. Although ribs 24a may remain substantially seated on the upper edge of the plate aperture, the distributors have a vibratory movement in a lateral direction so that they act effectively to dislodge and remove particles that might otherwise tend to accumulate in and clog the apertures. This feature is of considerable importance in that where the gas carries a considerable amount of tarry bodies, it frequently becomes necessary to shut down and clean the absorber because of inability to prevent these particles from clogging the plate apertures.

With the plate apertures closely spaced, and with the gas being spread radially in thin, high velocity streams from each aperture due to the baffling effect produced by the tapered distributor heads, there is a constant interference between the gas streams projected from adjacent apertures. The result is that the oil body is maintained in a state of violent agitation, the interfering gas streams causing the oil to form into an extremely fine froth which greatly increases the intimacy of contact between the gas and oil and accordingly the absorption efficiency.

As previously mentioned, the presence of ribs 24a overcomes the previously encountered difficulty where valves have been used to entirely close the plate apertures 14, by insuring that all the distributors will be caused to open, and to open to the same extent, with their controlled orifices uniformly brought into operation. Here the flow of gas is permitted past the distributors when the latter are in their seated positions, and since the thickness of the ribs is consistently uniform as to all the distributors, a uniform distribution of gas is maintained throughout the oil body standing on the plate. In addition, the oil surface tension which would otherwise act to prevent uniform opening of all the valves, is broken by the gas streams passing between the ribs 24a, and if the gas velocity is sufficient to raise the distributors from the position of Fig. 3, all will raise uniformly and the increased gas flow will be distributed uniformly across the plate.

The high gas velocity through the apertures under normal operation has the important advantage of preventing oil drainage through the apertures such as frequently occurs in the usual perforated plate type absorber, with resultant disturbance in the proper oil compositions and levels on the several plates, and loss in efficiency in entire absorption operation. In accordance with the invention, the presence of the distributor elements in the perforations so increases the gas velocity (by virtue of the decreased effective area of the perforations) as to obviate these difficulties experienced in the past, and preclude the possibility of oil drainage or down flow except by way of the overflow pipes.

I claim:

1. In oil and gas contacting apparatus of the character described, a horizontal plate having closely spaced fluid passing apertures, individual vertically movable distributor elements extending downwardly within said apertures, and means limiting downward movement of said elements so that in its lowermost position, each element has a substantially annular clearance from the edge of its respective aperture.

2. In oil and gas contacting apparatus of the character described, a horizontal plate having closely spaced fluid passing apertures, and individual vertically movable distributor elements associated with said apertures and extending downwardly therethrough, each of said elements comprising a head seating on the plate at circularly spaced points, and a reduced diameter shank extending through and having annular clearance within a plate aperture, there being narrow gas passing spaces between the points at which said element seats on said plate.

3. In oil and gas contacting apparatus of the character described, a horizontal plate having closely spaced fluid passing apertures, and individual vertically movable distributor elements associated with said apertures and extending downwardly therethrough, each of said elements comprising a downwardly tapered head with integral circularly spaced projections on its under surface which seat on the plate, and a reduced diameter shank extending through and having annular clearance within a plate aperture, there being narrow gas passing spaces between the points of engagement between said projections and the plate.

4. In oil and gas contacting apparatus, the combination comprising, a perforated plate adapted to support a body of oil, a vertically movable distributor element inserted in a plate aperture, said element comprising a head tapering toward a reduced diameter shank, and circularly spaced ribs on said tapered portion of the head and engaging said plate, there being narrow spaces between said ribs and through which gas is discharged into said body of oil while said ribs are in engagement with said plate.

5. In oil and gas contacting apparatus, the combination comprising, a perforated plate adapted to support a body of oil, a vertically movable distributor element inserted in a plate aperture, said element comprising a head tapering toward a reduced diameter shank which extends through said aperture, and circularly spaced ribs on said tapered portion of the head and engaging the plate, there being narrow spaces between said ribs and through which gas is discharged into said body of oil while said ribs are in engagement with said plate, and there being a bore extending longitudinally through said head into the shank.

6. In oil and gas contacting apparatus, the combination comprising, a perforated plate adapted to support a body of oil, a vertically movable distributor element inserted in a plate aperture, said element comprising a head having a tapered portion extending toward a reduced diameter shank, and circularly spaced ribs on said tapered portion of the head and seating on said plate, said shank being slotted longitudinally from its end opposite said head and the slotted portion spread to arrest upward movement of said element by engagement with the plate.

7. In oil and gas contacting apparatus, the combination comprising, a perforated plate adapted to support a body of oil, a vertically movable distributor element inserted in a plate aperture, said element comprising a head and an integral reduced diameter shank extending through said aperture, the peripheral edge of said head being irregular and presenting sharp points, and circularly spaced projections on the under side of said head and seating on the plate.

JULIAN A. CAMPBELL.